US012675944B2

(12) United States Patent
Moore et al.

(10) Patent No.: US 12,675,944 B2
(45) Date of Patent: Jul. 7, 2026

(54) PASSTHROUGH PIPELINE

(71) Applicant: Apple Inc., Cupertino, CA (US)

(72) Inventors: Christian I. Moore, Sunnyvale, CA
(US); Moinul H. Khan, San Jose, CA
(US); Seyedkoosha Mirhosseini, Santa
Clara, CA (US); **Simon
Fortin-Deschenes**, Santa Clara, CA
(US)

(73) Assignee: Apple Inc., Cupertino, CA (US)

( * ) Notice: Subject to any disclaimer, the term of this
patent is extended or adjusted under 35
U.S.C. 154(b) by 134 days.

(21) Appl. No.: 18/672,958

(22) Filed: May 23, 2024

(65) Prior Publication Data

US 2024/0404185 A1     Dec. 5, 2024

Related U.S. Application Data

(60) Provisional application No. 63/470,689, filed on Jun.
2, 2023.

(51) Int. Cl.
G06T 15/50         (2011.01)
G06T 3/18          (2024.01)

(52) U.S. Cl.
CPC .............. G06T 15/503 (2013.01); G06T 3/18
(2024.01)

(58) Field of Classification Search
CPC .......... G06T 15/503; G06T 3/18; G06T 5/50;
G06T 19/006; G06T 5/80; G06T 19/00;
(Continued)

(56) References Cited

U.S. PATENT DOCUMENTS 10,152,775 B1 * 12/2018 Bellows .................... G06T 5/80
11,127,148 B1 *  9/2021 Edmonds ............. H04N 13/128
(Continued)

FOREIGN PATENT DOCUMENTS

CN        115480719 A  * 12/2022  ............. G06T 15/20
KR   1020150035117 A      4/2015
(Continued)

OTHER PUBLICATIONS

The Extended European Search Report dated Oct. 15, 2024, European Application No. 24178418.0, pp. 1-11.
(Continued)

*Primary Examiner* — Michael Le
(74) *Attorney, Agent, or Firm* — Fernando & Partners,
LLP

(57) ABSTRACT

In one implementation, a method of pipelined blending an
image with virtual content is performed by a device including an image sensor, a display, one or more processors, and
non-transitory memory. The method includes capturing,
with the image sensor, a first portion of an image of a
physical environment. The method includes warping the first
portion of the image of the physical environment to generate
a warped first portion. The method includes blending the
warped first portion with a first portion of virtual content to
generate a blended first portion. The method includes displaying, on the display, the blended first portion. The method
includes capturing, with the image sensor, a second portion
of the image of the physical environment. The method
includes warping the second portion of the image of the
physical environment to generate a warped second portion.
The method includes blending the warped second portion
with a second portion of the virtual content to generate a
blended second portion. The method includes displaying, on
the display, the blended second portion, wherein displaying
(Continued)

the blended first portion is initiated before blending the warped second portion is completed.

20 Claims, 9 Drawing Sheets

(58) Field of Classification Search
CPC ...... G06V 20/64; G06V 20/647; G06V 20/20;
H04N 9/68; H04N 9/64; H04N 9/76
See application file for complete search history.

(56) References Cited

U.S. PATENT DOCUMENTS

| | | | |
|---|---|---|---|
| 2014/0267848 A1* | 9/2014 | Wu ...................... | G02B 27/123 |
| | | | 348/277 |
| 2020/0143516 A1* | 5/2020 | Martin ............... | G02B 27/0172 |
| 2022/0215506 A1 | 7/2022 | Wu et al. | |
| 2022/0398705 A1* | 12/2022 | Martin Brualla ......... | G06T 5/50 |
| 2024/0046577 A1* | 2/2024 | Xiong .................. | H04N 13/327 |

FOREIGN PATENT DOCUMENTS

| | | | | |
|---|---|---|---|---|
| KR | 101812664 B1 | 12/2017 | | |
| WO | WO-2019217262 A1 * | 11/2019 | ........... | H04N 19/119 |
| WO | WO-2022005707 A1 * | 1/2022 | ............. | G02B 27/01 |

OTHER PUBLICATIONS

Office Action for corresponding Korean Appl. No. 10-2024-0070750 dated Nov. 12, 2025, ENG translation, 10 pages.

* cited by examiner

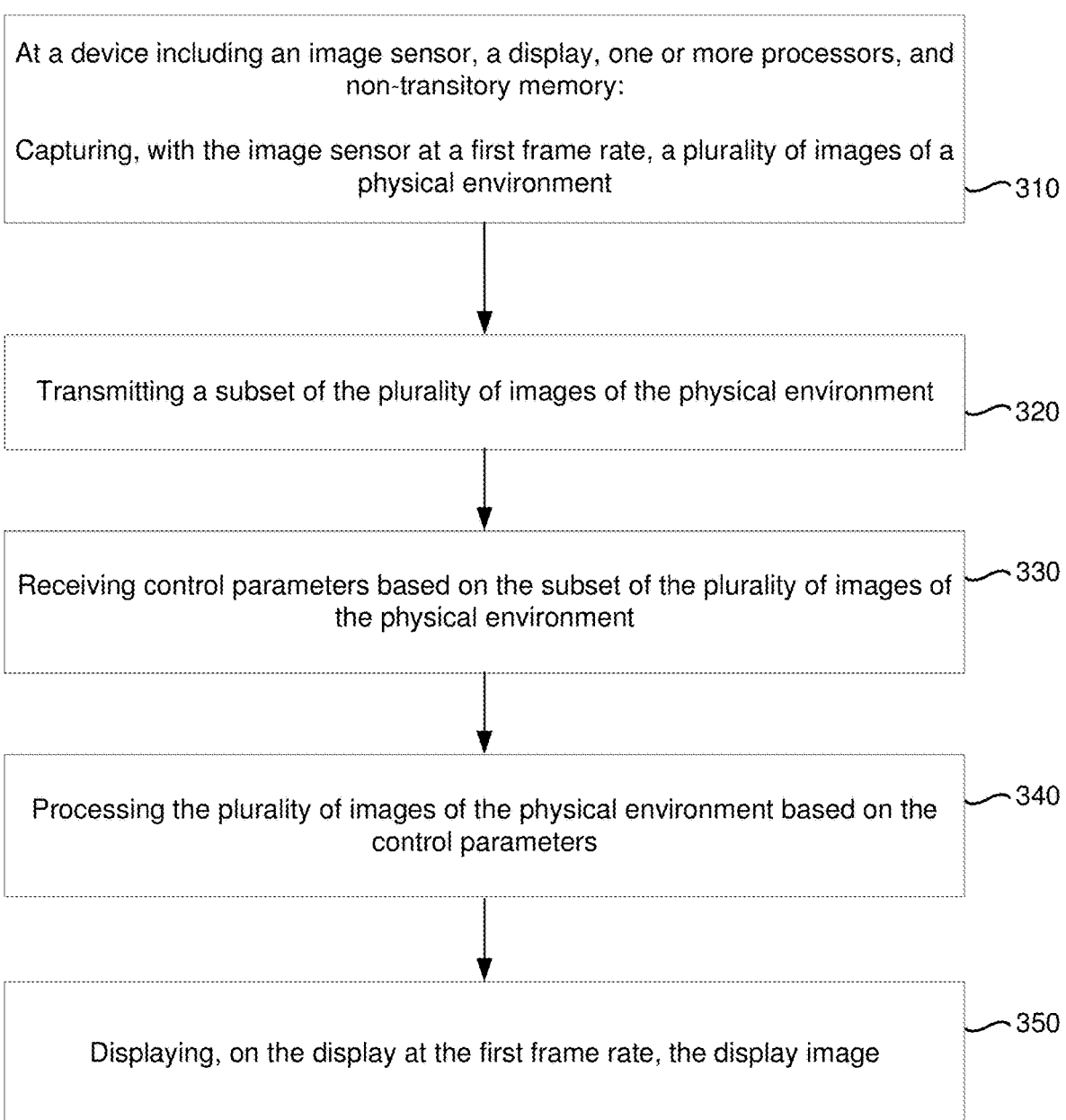

300

At a device including an image sensor, a display, one or more processors, and non-transitory memory:

Capturing, with the image sensor at a first frame rate, a plurality of images of a physical environment  ⌐310

Transmitting a subset of the plurality of images of the physical environment  ⌐320

Receiving control parameters based on the subset of the plurality of images of the physical environment  ⌐330

Processing the plurality of images of the physical environment based on the control parameters  ⌐340

Displaying, on the display at the first frame rate, the display image  ⌐350

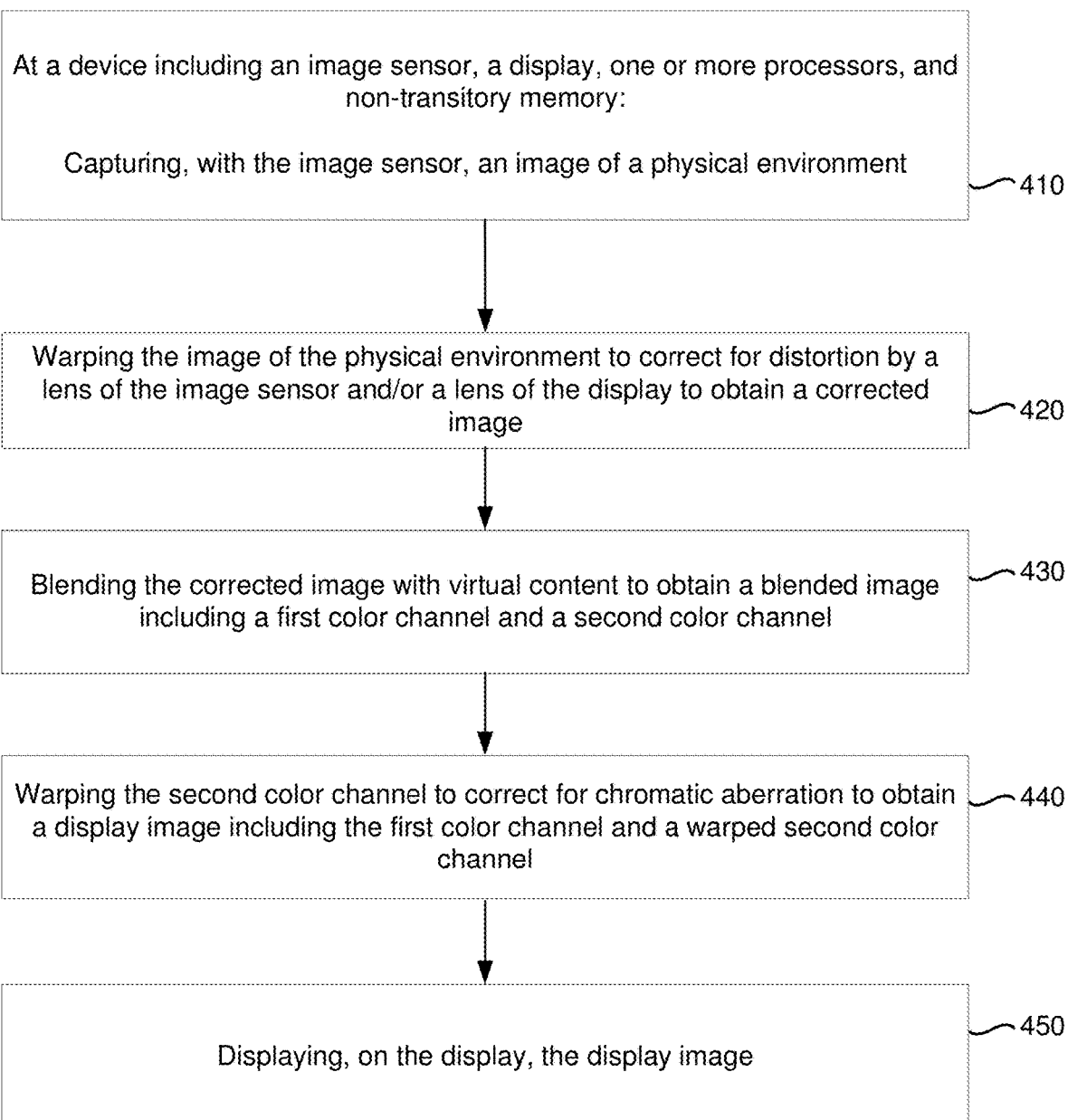

At a device including an image sensor, a display, one or more processors, and non-transitory memory:

Capturing, with the image sensor, an image of a physical environment — 410

Warping the image of the physical environment to correct for distortion by a lens of the image sensor and/or a lens of the display to obtain a corrected image — 420

Blending the corrected image with virtual content to obtain a blended image including a first color channel and a second color channel — 430

Warping the second color channel to correct for chromatic aberration to obtain a display image including the first color channel and a warped second color channel — 440

Displaying, on the display, the display image — 450

Figure 4

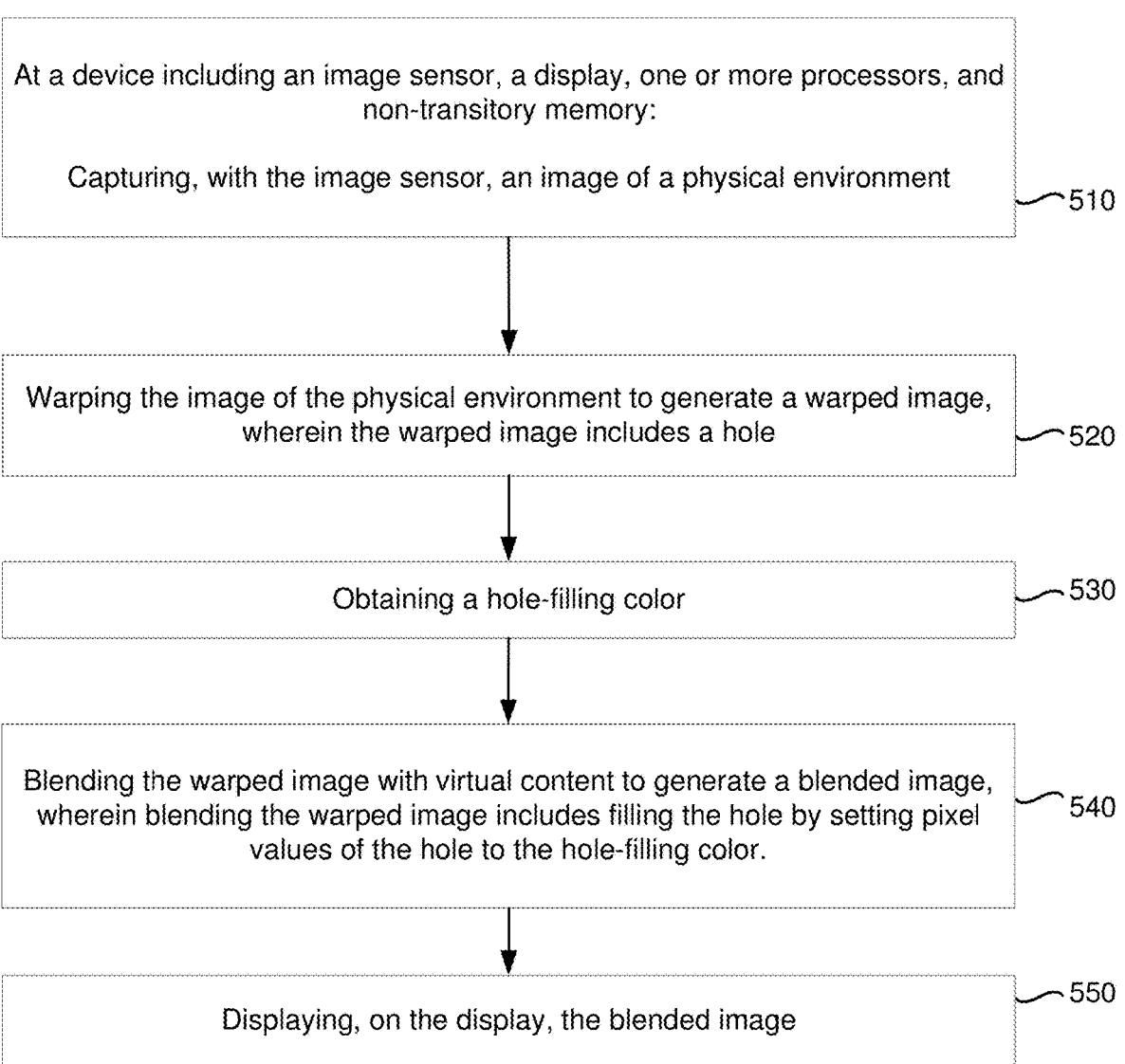

500

At a device including an image sensor, a display, one or more processors, and non-transitory memory:

Capturing, with the image sensor, an image of a physical environment     510

Warping the image of the physical environment to generate a warped image, wherein the warped image includes a hole     520

Obtaining a hole-filling color     530

Blending the warped image with virtual content to generate a blended image, wherein blending the warped image includes filling the hole by setting pixel values of the hole to the hole-filling color.     540

Displaying, on the display, the blended image     550

At a device including an image sensor, a display, one or more processors, and non-transitory memory:

Capturing, with the image sensor, a first portion of an image of a physical environment ⟋610

↓

Warping the first portion of image of the physical environment to generate a warped first portion ⟋620

↓

Blending the warped first portion with a first portion of virtual content to generate a blended first portion ⟋630

↓

Displaying, on the display, the blended first portion ⟋640

↓

Capturing, with the image sensor, a second portion of the image of the physical environment ⟋650

↓

Warping the second portion of image of the physical environment to generate a warped second portion ⟋660

↓

Blending the warped second portion with a second portion of virtual content to generate a blended second portion ⟋670

↓

Displaying, on the display, the blended second portion, wherein displaying the blended first portion is initiated before blending the warped second portion is completed ⟋680

Figure 6

PASSTHROUGH PIPELINE

CROSS-REFERENCE TO RELATED APPLICATIONS

This application claims priority to U.S. Provisional Patent App. No. 63/470,689, filed on Jun. 2, 2023, which is hereby incorporated by reference in its entirety.

TECHNICAL FIELD

The present disclosure generally relates to systems, methods, and devices for displaying virtual content in conjunction with an image of an environment at low latency.

BACKGROUND

In various implementations, an extended reality (XR) environment is presented by a head-mounted device (HMD). Various HMDs include a scene camera that captures an image of the physical environment in which the user is present (e.g., a scene) and a display that displays the image to the user. In some instances, this image, sometimes referred to as a passthrough image, or portions thereof can be combined with one or more virtual objects to present the user with an XR experience. In other instances, the HMD can operate in a passthrough mode in which the passthrough image or portions thereof are presented to the user without the addition of virtual objects. In various implementations, the passthrough image is processed after being captured and before being displayed. This processing introduces latency between the capture and display which may result in user disorientation and/or discomfort.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3B is a flowchart representation of a method of displaying a passthrough image stream with low latency in accordance with some implementations.

FIG. 4 is a flowchart representation of a method of performing chromatic aberration correction in accordance with some implementations.

FIG. 5 is a flowchart representation of a method of blending an image with virtual content and a hole-filling color in accordance with some implementations.

FIG. 6 is a flowchart representation of a method of pipelined blending an image with virtual content in accordance with some implementations.

Figure 1:
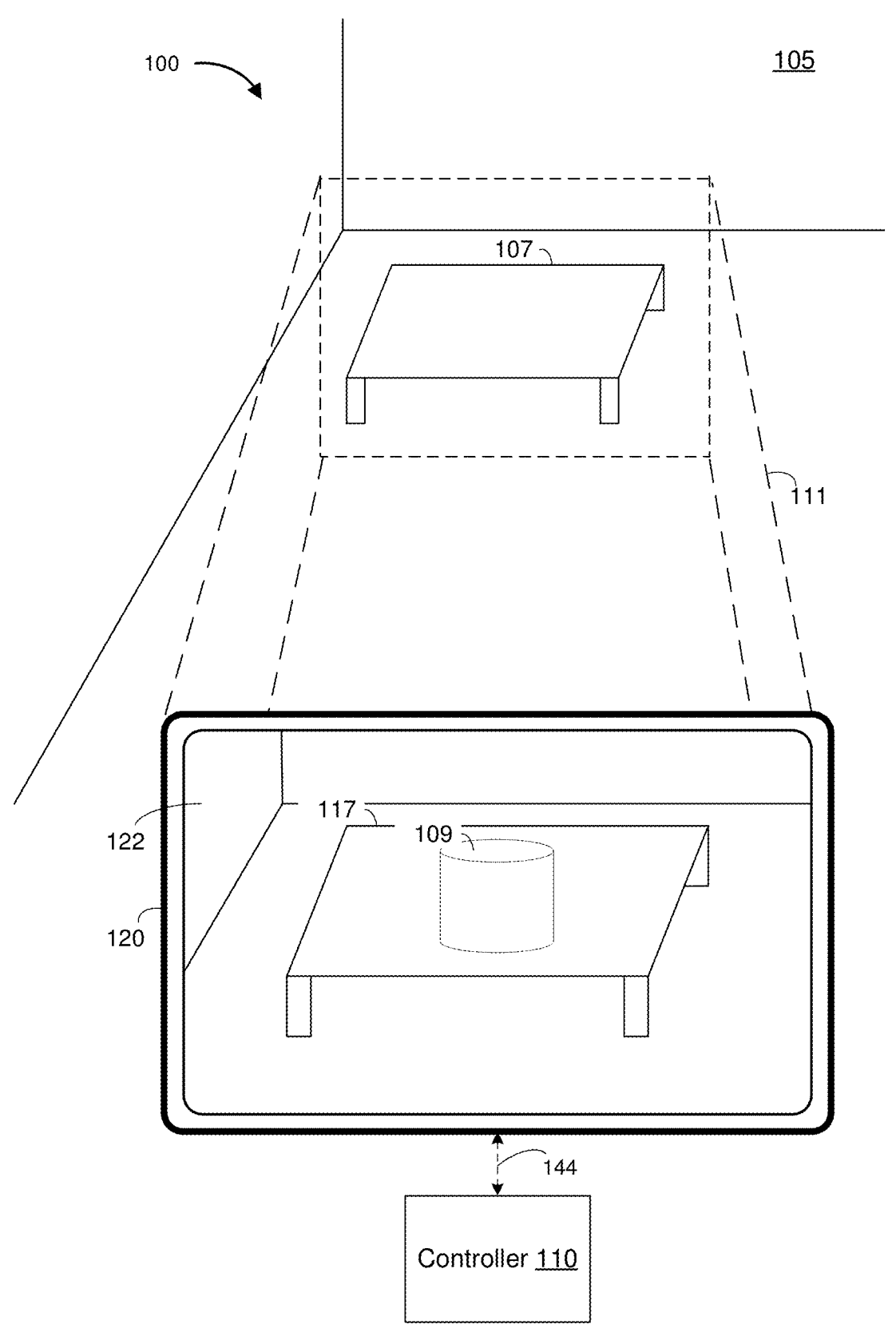
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for performing chromatic aberration correction. In various implementations, the method is performed by a device including an image sensor, a display, one or more processors, and non-transitory memory. The method includes capturing, with the image sensor, an image of a physical environment. The method includes warping the image of the physical environment to correct for distortion by a lens of the image sensor and/or a lens of the display to obtain a corrected image. The method includes blending the corrected image with virtual content to obtain a blended image including a first color channel and a second color channel. The method includes warping the second color channel to correct for chromatic aberration to obtain a display image including the first color channel and a warped second color channel. The method includes displaying, on the display, the display image.

Various implementations disclosed herein include devices, systems, and methods for blending an image with virtual content and a hole-filling color. In various implementations, the method is performed by a device including an image sensor, a display, one or more processors, and non-transitory memory. The method includes capturing, with the image sensor, an image of a physical environment. The method includes warping the image of the physical environment to generate a warped image, wherein the warped image includes a hole. The method includes obtaining a hole-filling color. The method includes blending the warped image with virtual content to generate a blended image, wherein blending the warped image includes filling the hole by setting pixel values of pixels of the hole to the hole-filling color. The method includes displaying, on the display, the blended image.

Various implementations disclosed herein include devices, systems, and methods for pipelined blending an image with virtual content. In various implementations, the method is performed by a device including an image sensor, a display, one or more processors, and non-transitory memory. The method includes capturing, with the image sensor, a first portion of an image of a physical environment. The method includes warping the first portion of the image of the physical environment to generate a warped first portion. The method includes blending the warped first portion with a first portion of virtual content to generate a blended first portion. The method includes displaying, on the display, the blended first portion. The method includes capturing, with the image sensor, a second portion of the image of the physical environment. The method includes warping the second portion of the image of the physical environment to generate a warped second portion. The method includes blending the warped second portion with a second portion of the virtual content to generate a blended second portion. The method includes displaying, on the display, the blended second portion, wherein displaying the blended first portion is initiated before blending the warped second portion is completed.

Various implementations disclosed herein include devices, systems, and methods for displaying a passthrough image stream with low latency. In various implementations, the method is performed by a device including an image sensor, a display, one or more processors, and non-transitory memory. The method includes capturing, with the image sensor at a first frame rate, a plurality of images of a physical environment. The method includes transmitting a subset of the plurality of images of the physical environment. The method includes receiving control parameters based on the subset of the plurality of images of the physical environment. The method includes processing the plurality of images of the physical environment based on the control parameters. The method includes displaying, on the display at the first frame rate, the plurality of processed images of the physical environment.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As described above, processing of a passthrough image can introduce latency between capturing the passthrough image and displaying the processed passthrough image. The processing can include, for example, filtering, reducing noise, performing color space conversion, adding virtual content, performing point-of-view correction, and/or correcting for lens distortion. Additional processing which may be performed is described further below. To reduce latency, the passthrough image is processed in a pipelined fashion in which portions of the passthrough image are processed while other portions are being captured.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 7. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 8.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
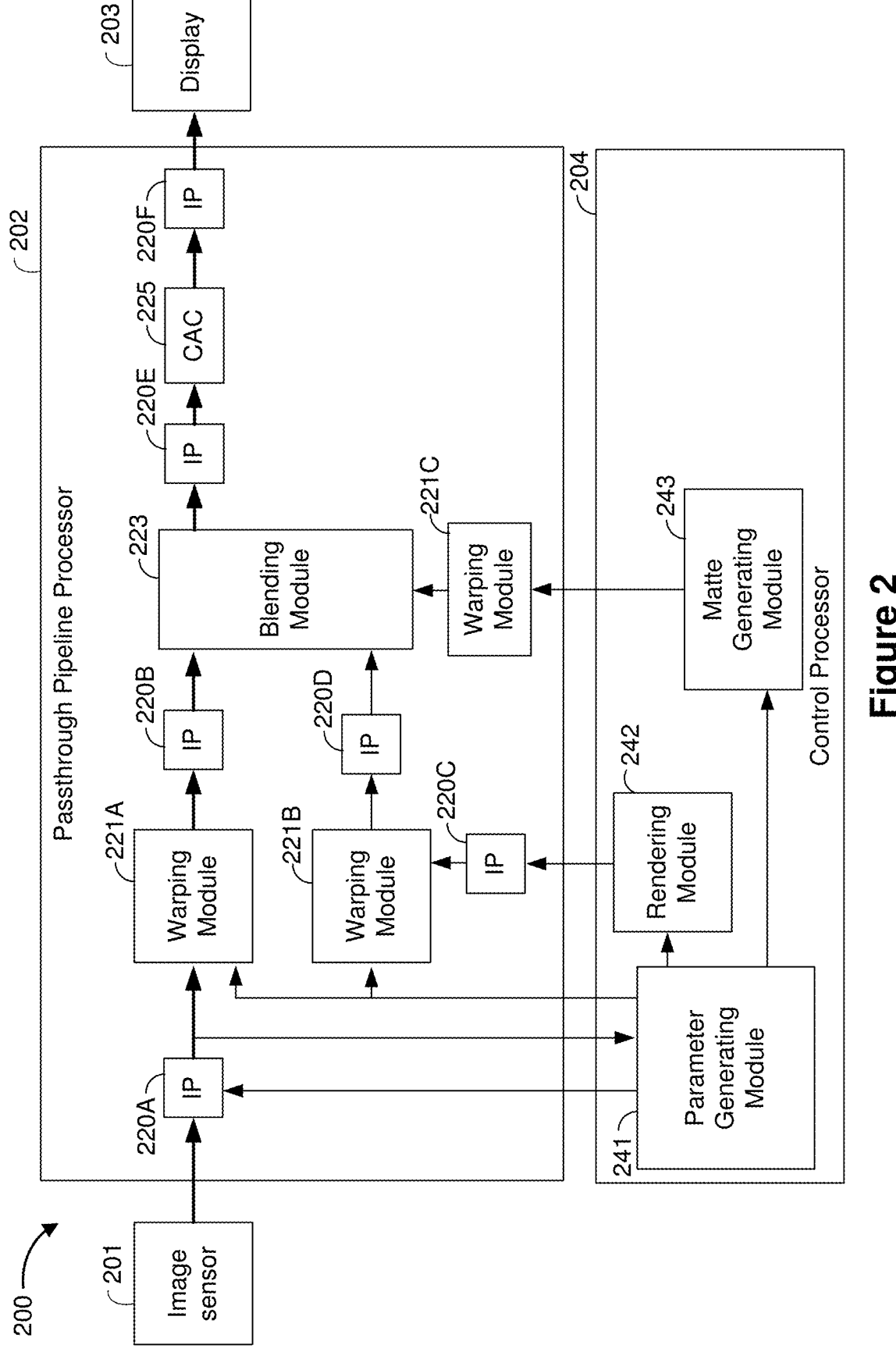
FIG. 2 illustrates a functional block diagram of an electronic device in accordance with some implementations.

FIG. 2 illustrates a functional block diagram of an electronic device 200 in accordance with some implementations. The electronic device 200 includes an image sensor 201 which captures images of a physical environment, a passthrough pipeline processor 202 which processes the captured images, and a display 203 which displays the processed images. The electronic device 200 includes a control processor 204 which generates parameters for controlling the processing of the captured images by the passthrough pipeline processor 202. In turn, the passthrough pipeline processor 202 processes the captured images based on the most recently received parameters from the control processor 204. In various implementations, the passthrough pipeline processor 202 and the control processor 204 are separate processors of the same electronic device 200. In various implementations, the control processor 204 is a separate processor of a different electronic device separate from the electronic device 200.

The passthrough pipeline processor 202 includes a number of modules, including a plurality of optional image processing modules 220A-220F. Each of the optional image processing modules 220A-220F performs one or more image processing functions on an input image to produce an output image. In various implementations, the image processing functions include filtering, noise reduction, dithering, gamma correction, color space conversion, demosaicing, or shifting. The passthrough pipeline processor 202 further includes a first warping module 221A, an optional second warping module 221B, and an optional third warping module 221C. Each warping module 221A-221C warps an input image into an output image based on a warp definition. The warp definition defines a mapping between destination pixel locations of the output image and source pixel locations of the input image. In particular, whereas the pixel value of a particular pixel of an output image of one of the optional image processing modules 220A-220F may be based on pixel values of other pixels of the input image, the identity of the other pixels is not separately provided. In contrast, the pixel value of a particular pixel of an output image of one of the warping modules 221A-221C may be based on pixel values of other pixels of the input image as defined by the warp definition.

The image sensor 201 captures images, at a first frame rate, of a physical environment in which the electronic device 200 is present. In various implementations, the first frame rate is 90 frames per second. The images captured by the image sensor 201 are fed into a first optional image processing module 220A as input images. In various implementations, the image sensor 201 provides the input images to the first optional image processing module 220A in a raw image format. In various implementations, the passthrough pipeline processor 202 obtains the captured images via direct memory access. In various implementations, the first optional image processing module 220A performs, upon the input images to produce output images, one or more of sensor linearization, gain offset correction, pixel defect correction, chromatic aberration recovery (of lateral chromatic aberration), front-end horizontal scaling for one-dimensional highlight recovery, noise reduction (such as raw noise filtering with a 3×3 bilateral filter, fixed pattern noise reduction, and/or multiband noise reduction), raw vertical filtering, lens shading correction, demosaicing, global and/or local tone mapping, global and/or local contrast enhancement, hue preservation post-processing, sharpening, color post-processing, and highlight recovery. In various implementations, the output images of the first optional image processing module 220A are in a YCbCr image format.

The output images of the first optional image processing module 220A are fed, at the first frame rate, into the first warping module 221A as input images. This video stream is also sampled by or for the control processor 204 at a second frame rate, less than the first frame rate. For example, in various implementations, every other output image or every third output image of the first optional image processing module 220A is sent to the control processor 204. In various implementations, the video stream is sampled asynchronously. In various implementations, the output images are spatially downsampled before being sent to the control processor 204.

The control processor 204 includes a parameter generating module 241 that generates parameters for controlling the processing of the images by the passthrough pipeline processor 204. For example, in various implementations, the parameter generating module 241 generates parameters for controlling the image processing performed by the first optional image processing module 220A. In various implementations, the parameter generating module 241 generates warp definitions for the first warping module 221A, the optional second warping module 221B, and/or the optional third warping module 221C.

Although FIG. 2 illustrates the parameter generating module 241 providing parameters to the first optional image processing module 220A, the first warping module 221A and the optional second warping module 221B, it is to be appreciated that the parameter generating module 241 can provide parameters or other information to any of the modules of the passthrough pipeline processor 202, the image sensor 201, or the display 203.

As noted above, the output images of the first optional image processing module 220A are fed, at the first frame rate, into the first warping module 221A as input images. In various implementations, the first warping module 221A warps the input images into output images based on a first warp definition which defines a mapping between destination pixel locations of the output image and source pixel locations of the input image. In various implementations, the first warping module 221A receives the first warp definition from the parameter generating module 241 of the control processor 204.

In various implementations, the mapping is a forward mapping in which, for each pixel of the input image at a pixel location in an input space, a destination pixel location is determined in an output space of the output image. In various implementations, the warping is a backwards mapping in which, for each pixel of the output image at a pixel location in the output space, a source pixel location is determined in the input space.

In various implementations, the warp definition is generated to perform point-of-view correction (POVC) on the input image to at least partially correct for a difference in perspective of the image sensor 201 at a capture time and the display 203 at a display time. In various implementations, the transformation matrix is generated to perform lens distortion correction on the input image to at least partially correct for distortion caused by a lens of the image sensor 201 and/or a lens of the display 203. In various implementations, the warp definition is generated to perform optical crosstalk correction on the input image to at least partially correct for incomplete isolation of left and right image channels. In various implementations, the warp definition is generated to perform foveation on the input image. In various implementations, the transformation matrix is generated to perform fewer or additional functions.

The output images of the first warping module 221A are fed into a second optional image processing module 220B as input images. In various implementations, the second image processing module 220B performs, on the input images to produce output images, color space conversion, gamma correction, and filtering. In various implementations, the output images of the second image processing module 220B are in an RGB format.

The output images of the second optional image processing module 220B (referred to as the passthrough images) are fed into a blending module 223 to be combined with virtual content. The virtual content is obtained from a rendering module 242 of the control processor 204 that generates images of virtual content based on the sampled video feed of the images captured by the image sensor 201 and processed by the first optional image processing module 220A. To that end, the rendering module 242 receives the images or parameters based on the images from the parameter generating module 241.

The display 203 includes a matrix of $M_D \times N_D$ pixels located at respective locations in a display space. In various implementations, the display 203 includes two such matrices, one to be positioned in front of a left eye of a user and another to be positioned in front of a right eye of a user.

In various implementations, in order to render an image of virtual content to be blended with the passthrough image for display on the display 203, the rendering module 242 generates $M_D \times N_D$ pixel values for each pixel of an $M_D \times N_D$ image. In various implementations, the rendering module 242 renders two such images, one for each eye of the user. Thus, each pixel of the rendered image corresponds to a pixel of the display 203 with a corresponding location in the display space. Thus, the rendering module 242 generates a pixel value for $M_D \times N_D$ pixel locations uniformly spaced in a grid pattern in the display space.

Rendering $M_D \times N_D$ pixel values can be computationally expensive. Further, as the size of the rendered image increases, so does the amount of bandwidth needed to transmit the rendered image from the control processor 204 to the passthrough pipeline processor 202 and the amount of processing needed to process the image at the passthrough pipeline processor 202.

In various implementations, in order to decrease the size of the rendered image without degrading the user experience, foveation (e.g., foveated imaging) is used. Foveation is a digital image processing technique in which the image resolution, or amount of detail, varies across an image. Thus, a foveated image has different resolutions at different parts of the image. Humans typically have relatively weak peripheral vision. According to one model, resolvable resolution for a user is maximum over a fovea (e.g., an area where the user is gazing) and falls off in an inverse linear fashion. Accordingly, in one implementation, the displayed image displayed by the display 203 is a foveated image having a maximum resolution at a fovea and a resolution that decreases in an inverse linear fashion in proportion to the distance from the fovea.

Because some portions of the image have a lower resolution, an $M_D \times N_D$ foveated image includes less information than an $M_D \times N_D$ unfoveated image. Thus, in various implementations, the rendering module 242 generates, as a rendered image, a foveated image. The rendering module 242 can generate an $M_D \times N_D$ foveated image more quickly and with less processing power (and battery power) than the rendering module 242 can generate an $M_D \times N_D$ unfoveated image. Also, an $M_D \times N_D$ foveated image can be expressed with less data than an $M_D \times N_D$ unfoveated image. In other words, an $M_D \times N_D$ foveated image file is smaller in size than an $M_D \times N_D$ unfoveated image file. In various implementations, compressing an $M_D \times N_D$ foveated image using various compression techniques results in fewer bits than compressing an $M_D \times N_D$ unfoveated image.

A foveation ratio, R, can be defined as the amount of information in the $M_D \times N_D$ unfoveated image divided by the amount of information in the $M_D \times N_D$ foveated image. In various implementations, the foveation ratio is between 1.5 and 10. For example, in some implementations, the foveation ratio is 2. In some implementations, the foveation ratio is 3 or 4. In some implementations, the foveation ratio is constant among images. In some implementations, the foveation ratio is determined for the image being rendered. For example, in various implementations, the amount of information the rendering module 242 is able to render in a frame period may decrease due to a thermal event (e.g., when processing to compute additional pixel values would cause a processor to overheat).

In some implementations, in order to render an image for display on the display 203, the rendering module 242 generates $M_D/R \times N_D VR$ pixel values for each pixel of an $M_D/R \times N_D R$ warped image. Each pixel of the warped image corresponds to an area greater than a pixel of the display 203 at a corresponding location in the display space. Thus, the rendering module 242 generates a pixel value for each of $M_D/R \times N_D VR$ locations in the display space that are not uniformly distributed in a grid pattern. The respective area in the display space corresponding to each pixel value is defined by the corresponding location in the display space (a rendering location) and a scaling factor (or a set of a horizontal scaling factor and a vertical scaling factor).

In various implementations, the rendering module 242 generates, as a rendered image, a warped image. In various implementations, the warped image includes a matrix of $M_D/R \times N_D/R$ pixel values for $M_D/R \times N_D/R$ locations uniformly spaced in a grid pattern in a warped space that is different than the display space. Particularly, the warped image includes a matrix of $M_D/R \times N_D/R$ pixel values for $M_D/R \times N_D/R$ locations in the display space that are not uniformly distributed in a grid pattern. Thus, whereas the resolution of the warped image is uniform in the warped space, the resolution varies in the display space.

The output images of the rendering module 242 are fed into a third optional image processing module 220C as input images. The output images of the third optional image processing module 220C are fed into an optional second warping module 221B which warps the input images into output images based on a second warping definition. In various implementations, the optional second warping module 221B receives the second warping definition from the parameter generating module 241 of the control processor 204.

In various implementations, the warp definition is generated to perform point-of-view correction (POVC) on the input image to at least partially correct for a difference in perspective of the virtual camera at a rendering time and the display 203 at a display time. In various implementations, the transformation matrix is generated to perform lens distortion correction on the input image to at least partially correct for distortion caused by a lens of the display 203. In various implementations, the warp definition is generated to perform optical crosstalk correction on the input image to at least partially correct for incomplete isolation of left and right image channels. In various implementations, the transformation matrix is generated to perform fewer or additional functions. The output images of the optional second warping module 221B are fed into an optional fourth image processing module 220D as input images.

The output images of the fourth optional image processing module 220D (referred to as the virtual content images) are fed into the blending module 223 to be combined with the passthrough images.

In various implementations, the blending module 223 combines the passthrough images and the virtual content images to generate blended images. In various implementations, the passthrough images, the virtual content images, and the blended images are the same size and image format. For example, in various implementations, the virtual content images are $M_L/R \times N_L/R$ images in an RGB format. Accordingly, in various implementations, the passthrough images are $M_L/R \times N_L/R$ images in an RGB format. In various implementations, the output images of the first image processing module 220A are $M_C \times M_N$ images in a YCbCr format or RGB format. The first warping module 221A warps the input images to foveate the input images into $M_D/R \times N_D/R$ images and, in various implementations, the optional second image processing module 220B performs color space conversion to convert the passthrough images into an RGB format.

In various implementations, the blending module 223 generates the blended images by combining the passthrough images and the virtual content images according to alpha masks of the same size as the virtual content images. For example, the pixel value of a particular pixel at a pixel location of the blended image is equal to a weighted average of the pixel value of a corresponding pixel at the pixel location of the passthrough image and a pixel value of a corresponding pixel at the pixel location of the virtual content image, wherein the weighting is defined by an alpha value of a corresponding pixel at the pixel location of the alpha mask.

In various implementations, the blending module 223 generates the alpha mask based on a rendered alpha mask received from the rendering module 242 and a matte alpha mask received from the matte generating module 243. The rendered alpha mask describes the opacity of the virtual content, ranging from 0 for invisible to 1 for opaque, and including intermediate values for semi-transparent content, such as virtual glass. The matte alpha mask describes areas of the virtual content which are to be occluded by dynamic objects in the physical environment, such as hands of the user or other people. In various implementations, the matte generating module 243 generates the matte alpha mask by applying matting coefficients from a previous captured image to a current captured image. Thus, the matte generating module 243 predicts the location of the dynamic objects in the current captured image. In various implementations, the matte generating module 243 predicts the location of the dynamic objects with other methods, such as reprojection based on predicted pose and movement of the dynamic objects.

In various implementations, the passthrough pipeline processor 202 includes the optional third warping module 221C between the matte generating module 243 and the blending module 223 that warps an input matte alpha mask into an output matte alpha mask based on a third warping definition. In various implementations, the optional third warping module 221B receives the third warping definition from the parameter generating module 241 of the control processor 204.

In various implementations, the first warping module 221A performs a forward mapping in which, for each pixel of the input image at a pixel location in an input space, a destination pixel location is determined in an output space of the output image. However, in some circumstances, not every destination pixel location is populated, resulting in one or more holes. In various implementations, the first warping module 221A performs a backwards mapping in which, for each pixel of the output image at a pixel location in the output space, a source pixel location is determined in the input space. However, in some circumstances, a source pixel location cannot be identified or the source pixel location does not have a pixel value, resulting in one or more holes.

In various implementations, the first warping module 221A fills a hole using interpolation. In various implementations, the rendering module 242 renders hole-filling virtual content to cover a hole once the hole-filling virtual content is blended with the passthrough image by the blending module 223. In various implementations, the hole-filling virtual content is the size and shape of the hole. In various implementations, the hole-filling virtual content is based on previously captured images of the physical environment. In various implementations, the hole-filling virtual content is a hole-filing color (e.g., a color triplet).

In various implementations, the hole-filling color is a default hole-filling color, which may be, for example, white, black, or gray. In various implementations, the hole-filling color is an average of the passthrough image (or an average of a region of the passthrough image, such as a region surrounding a gaze location of a user). In various implementations, the hole-filling color is user-defined or application-defined.

The blended images are fed by the blending module 223 as input images to a fifth optional image processing module 220E. In various implementations, the fifth optional image processing module 220E performs, on the input images to produce output images, gamma correction and filtering.

The output images of the fifth optional image processing module 220E are fed into a chromatic aberration correction (CAC) module 225 as input images. In various implementations, the first warping module 221A, the optional second warping module 221B, and/or the optional third warping module 221B perform a transform to correct for lens distortion caused by a lens of the image sensor 201 and/or a lens of the display 203. However, the lens distortion caused by the lens of the image sensor 201 and/or the lens of the display 203 varies as a function of wavelength (e.g., color), referred to as chromatic aberration. The CAC module 225 performs a warping function on at least one color channel of the output images to correct for chromatic aberration. In various implementations, the CAC module 225 performs a warping function on less than all of the color channels of the output images. For example, in various implementations, the output images have three color channels and the CAC module 225 performs a warping function on only one or two of the color channels. For example, in various implementations, the output images have a red color channel, a green color channel, and a blue color channel and the CAC module 225 performs a warping function for only the red color channel and the blue color channel.

In various implementations, the first warping module 221A, the optional second warping module 221B, and/or the optional third warping module 221B perform a transform to correct for lens distortion such that a particular color (e.g., green) is least distorted. Then, the CAC module 225 performs a transform on the red color channel and the blue color channel to correct for chromatic aberration.

The output images of the CAC module 225 are fed into an optional sixth image processing module 220F as input images. The optional sixth image processing module 220F performs, on the input images to produce output images, optical crosstalk correction, dithering, and a shift. The output images of the optional sixth image processing module 220F (referred to as display images) are fed to the display 203 and displayed, at the first frame rate, by the display 203.

Because the passthrough pipeline processor 202 processes the captured images based on the most recently received parameters from the control processor 204, if the control processor 204 does not provide updated parameters for a current frame, a captured image is still processed (using parameters for a previous frame) and displayed without introducing latency. Thus, if an error occurs at the control processor 204 (e.g., the control processor crashes 204) and the control processor 204 fails to provide updated parameters to the passthrough pipeline processor 202, the captured images are still processed by the passthrough pipeline processor 202 and displayed at the first frame rate.

In various implementations, the image sensor 201 is a rolling-shutter camera. Thus, in various implementations, the image sensor 201 captures an image over a capture time period. For example, in various implementations, each line of the image sensor 201 is exposed over a different exposure time period have an exposure time period length and, following the exposure time period, the resulting values are read out over a corresponding readout time period having a readout time period length. The exposure time period for each line after the first line begins a readout time period length after the exposure time period for the previous line begins.

Similarly, in various implementations, the display 203 is a rolling display. Thus, in various implementations, the display 203 displays a display image over a display time period. For example, in various implementations, each line of the display image is loaded at a different loading time period having a loading time period length and, following the loading time period, the line persists over a corresponding persistence time period having a persistence time period length. The loading time period for each line after the first line begins a loading time period length after the loading time period for the previous line begins.

Accordingly, in various implementations, processing of an earlier-captured portion of the captured image can begin before a later-captured portion of the captured image is captured. Further, processing to generate the display image can continue on a later-displayed portion of the display image while an earlier-displayed portion of the display image is displayed.

In various implementations, the parameter generating module 241 generates parameters based on predicted conditions at a display time within the display time period. In various implementations, the display time is the middle of the display time period (or, in various implementations, the middle of the persistence time periods). For example, in various implementations, the parameter generating module 241 generates the parameters based on a predicted pupil position at the display time, a predicted gaze at the display time, or a predicted device pose at the display time. In various implementations, the parameter generating module 241 predicts the pupil position, gaze, and/or pose at the display time based on previously captured images.

In various implementations, the parameter generating module 241 generates the first warp definition to perform point-of-view correction based on a predicted pose of the device at the display time. In particular, the parameter generating module 241 generates the first warp definition based on a difference between the predicted pose at the display time and a predicted pose at a capture time within the capture time period (which may be different for different portions of the image due to the rolling-shutter camera). In various implementations, the parameter generating module 241 generates the first warp definition to perform foveation based on a predicted gaze at the display time. In various implementations, the parameter generating module 241 generates the warp definitions to perform lens distortion correction based on a predicted pupil position at the display time. In various implementations, the parameter generating module 241 provides parameters to the optional sixth image processor 220F to perform optical crosstalk correction based on a predicted pupil position at the display time.

Figure 3A:
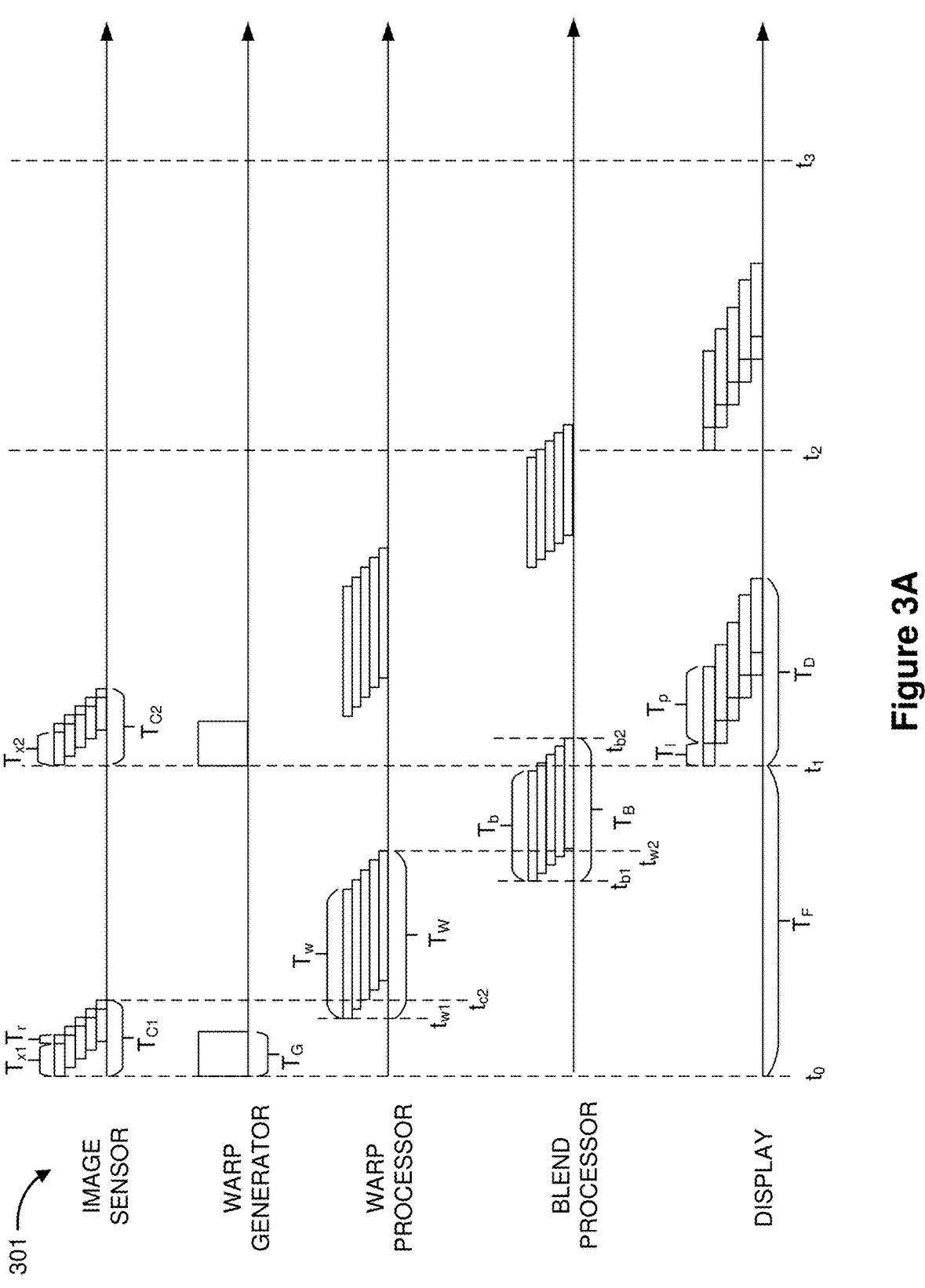
FIG. 3A illustrates a timing diagram for an electronic device in accordance with some implementations.

FIG. 3A illustrates a timing diagram 301 for an electronic device (e.g., the electronic device 200 of FIG. 2) in accordance with some implementations. Time is partitioned into a plurality of frames, each having a frame time period length, $T_F$. During a first frame (from $t_0$ to $t_1 = t_0 + T_F$), an image sensor captures a first image over a first capture time period having a first capture time period length, $T_{C1}$ (from $t_0$ to $t_0 + T_{C1}$). As described above, in various implementations, the image sensor is a rolling-shutter camera. For example, in various implementations, each of n lines (of which 5 are illustrated in FIG. 3A) of the image sensor is exposed over a different exposure time period having a first exposure time period length, $T_{x1}$, and, following the exposure time period, the resulting values are read out over a corresponding readout time period having a readout time period length, $T_r$. The exposure time period for each line after the first line begins a readout time period length, $T_r$, after the exposure time period for the previous line begins.

During the first frame, a warp generator generates, over a first warp generation time period having a warp generation time period length, $T_G$ (from $t_0$ to $t_0 + T_G$), a first warp definition. In various implementations, the first warp definition is generated to perform point-of-view correction based on a predicted pose of the device at a display time (within the first display time period during the second frame), perform lens distortion correction based on a predicted pupil position at the display time, perform foveation based on a predicted gaze at the display time, or any other transform. In various implementations, the during the first warp generation time period, the warp generator also generates warp definitions for an image of virtual content image and/or a matte alpha mask.

Further, beginning in the first frame, after a number of lines of the first image have been read out, a warp processor generates, using the first warp definition, a first warped image over a first warp processing time period having a warp processing time period length, $T_w$. In various implementations, each line is warped over a different line warp processing time period having a line warp processing time period length, $T_w$. The line warp processing time period for each line after the first line begins a readout time period length, $T_r$, after the line warp processing time period for the previous line begins.

In various implementations, the first warp processing time period begins (at $t_{w1}$) before the first capture time period ends (at $t_{c2}$).

In various implementations, during the first warp processing time period, the warp processor also warps (using a respective warp definition) an image of virtual content of a rendering module. In various implementations, during the first warp processing time period, the warp processor also warps (using a respective warp definition) a matte alpha mask of a matte generating module. In various implementations, like the passthrough image, each line is warped over a different line warp processing time period. Thus, warping of the passthrough images, virtual content images, and/or matte alpha masks can be performed in parallel.

Also beginning in the first frame, after a first line of the first image has been warped (and, in some implementations, subject to additional non-warping image processing such as color space conversion, filtering, and/or gamma correction), a blend processor generates a first blended image over a first blend processing time period having a blend processing time period length, $T_B$. In various implementations, each line of the first image is blended with a corresponding line of virtual content according to a corresponding line of a matte alpha mask over a different line blend processing time period having a line blend processing time period length, $T_b$. The line blend processing time period for each line after the first line begins a readout time period length, $T_r$, after the line blend processing time period for the previous line begins.

In various implementations, the first blend processing time period begins (at $t_{b1}$) before the first warp processing time period ends (at $t_{w2}$).

During a second frame, a display initiates display of the first blended image over a first display time period having a display time period length, $T_D$ (from $t_1$ to $t_1 + T_D$). In various implementations, the display is a rolling display. For example, in various implementations, each of m lines (of which 5 are illustrated in FIG. 3A) of the first blended image is loaded at a different loading time period having a loading time period length, $T_l$, and, following the loading time period, the line persists over a corresponding persistence time period having a persistence time period length, $T_p$. The loading time period for each line after the first line begins a loading time period length, $T_l$, after the loading time period for the previous line begins.

During the second frame (from $t_1$ to $t_2 = t_1 + T_f$), the image sensor captures a second image over a second capture time period having a second capture time period length, $T_{C2}$ (from $t_1$ to $t_1 + T_{C2}$). In various implementations, the second capture time period length, $T_{C2}$, is longer or shorter than the first capture time period length, $T_{C1}$, due to a longer or shorter second exposure time period length, $T_{x2}$.

During the second frame, a warp generator generates, over a second warp generation time period having the warp generation time period length, $T_G$ (from $t_1$ to $t_1 + T_G$), a second warp definition. In various implementations, the second warp definition is generated to perform point-of-view correction based on a predicted pose of the device at a display time (within the second display time period during the third frame), perform lens distortion correction based on a predicted pupil position at the display time, perform foveation based on a predicted gaze at the display time, or any other transform.

Further, beginning in the second frame, after a number of lines of the second image have been read out, the warp processor generates, using the second warp definition, a second warped image over a second warp processing time period having a warp processing time period length, $T_W$.

Also beginning in the second frame, after a first line has been warped (and, in some implementations, subject to additional non-warping image processing such as color space conversion, filtering, and/or gamma correction), the blend processor generates a second blended image over a second blend processing time period having a blend processing time period length, $T_B$.

During a third frame, a display initiates display of the second warped image over a second display time period having a display time period length, $T_D$ (from $t_2$ to $t_2 + T_D$).

Although FIG. 3A illustrates some processing that may be applied to the images, in various implementations, additional processing is performed. For example, for a first line of the first image, after the first line has been captured (at $t_{x1} + T_r$) and before the first line is warped (at $t_{w1}$), image processing may be performed as described with respect to the first optional image processing module 220A of FIG. 2. As another example, for the first line of the first image, after the first line has been warped (at $t_{w1} + T_W$) and before the first line is blended (at $t_{b1}$), image processing may be performed as described with respect to the second optional image processing module 220B of FIG. 2. As another example, for the first line of the first image, after the first line has been blended (at $t_{b1} + T_b$) and before the first line is displayed (at $t_1$), image processing may be performed as described with respect to the fifth optional image processing module 220E, the CAC module 225, and the sixth optional image processing module 220F of FIG. 2.

As noted above, in various implementations (and as illustrated in FIG. 3A), warping of the first line of an image begins before capturing of the last line ends; blending of the first line begins before the warping of the last line ends, and display of the first line begins before blending of the last line ends. In various implementations (though not illustrated in FIG. 3A), blending may be performed rapidly enough that display of the first line begins before warping of the last line ends.

In various implementations, the first capture time period overlaps with the first warp processing time period, the first warp processing time period overlaps with the first blend processing time period, and the first blend processing time period overlaps with the first display time period. In various implementations, blending may be performed rapidly enough that the first warp processing time period overlaps with the first display time period.

In various implementations, the time between beginning to capture the first line of an image and finishing blending of the last line of the image is greater than a frame period. Similarly, in various implementations, the time between beginning to capture the first line of an image and beginning to display the last line of the image is greater than a frame period.

Although FIG. 3A has been described above with respect to lines of an image, it is to be appreciated that similar pipelining could be performed for slices, tiles, or other portions of images with different shapes.

FIG. 3B is a flowchart representation of a method of displaying a passthrough image stream with low latency in accordance with some implementations. In various implementations, the method 300 is performed by a device including an image sensor, a display, one or more processors, and non-transitory memory (e.g., the electronic device 120 of FIG. 1). In some implementations, the method 300 is performed by processing logic, including hardware, firmware, software, or a combination thereof. In some implementations, the method 300 is performed by a processor executing instructions (e.g., code) stored in a non-transitory computer-readable medium (e.g., a memory).

The method 300 begins, in block 310, with the device capturing, with the image sensor at a first frame rate, a plurality of images of a physical environment. For example, in FIG. 2, the images of the physical environment may correspond to output images of the image sensor 201 or the first optional image processing module 220A. Accordingly, in various implementations, capturing the plurality of images includes capturing raw images and performing one or more image processing functions on the raw images (e.g., as described above with respect to the first optional image processing module 220A) to generate the images of the physical environment.

The images of the physical environment are captured at a first frame rate. For example, in various implementations, the images are captured at a first frame rate of 90 frames per second. Thus, in every second, 90 images of the physical environment are captured. Further, the respective start time of capturing each of the plurality of images is a frame period after the respective start time of capturing a previous one of the plurality of images.

The method 300 continues, in block 320, with the device transmitting a subset of the plurality of images of the physical environment. For example, in FIG. 2, the pass-through pipeline processor 202 transmits a subset of the output images from the first optional image processing module 220A to the control processor 204. In various implementations, transmitting the subset of the plurality of images of the physical environment includes transmitting, at a second frame rate less than the first frame rate, the subset of the plurality of images of the physical environment. For example, in various implementations, every other or every third image is transmitted. In various implementations, transmitting the subset of the plurality of images of the physical environment includes transmitting a downsampled version of at least one of the plurality of images of the physical environment.

The method 300 continues, in block 330, with the device receiving control parameters based on the subset of the plurality of images of the physical environment. For example, in FIG. 2, the passthrough pipeline processor 202 receives control parameters from the control processor 204. In various implementations, the control parameters includes parameters for one or more image processing functions. For example, in FIG. 2, the first image processing module 220A receives control parameters from the parameter generating module 241. Thus, a feedback loop is generated between the first optional image processing module 220A and the parameter generating module 241. Thus, in various implementations, capturing (in block 310) at least one of the plurality of images of the physical environment is based on receiving (in block 330) control parameters based on another of the plurality of images of the physical environment.

In various implementations, the control parameters for a current frame are based on a predicted condition at a display time of the current frame. In various implementations, the method includes predicting the condition at the display time for the current frame based on measurements taken during one or more previous frames. In particular, in various implementations, the control parameters are based on a predicted pose of an eye of a user. For example, in various implementations, the control parameters are based on a predicted pose of an eye of a user with respect to the device (e.g., a predicted pupil position). In various implementations, the control parameters are based on a predicted pose of an eye of the user with respect to the head of the user (e.g., a predicted gaze). In various implementations, the control parameters are based on a predicted pose of an eye of the user with respect to the physical environment (e.g., a predicted pose of the device, where the device, the user's head, and the user's eye is in space).

The method 300 continues, in block 340, with the device processing the plurality of images of the physical environment based on the control parameters. In various implementations, the control parameters include a warp definition. Thus, in various implementations, processing the plurality of images of the physical environment based on the control parameters includes warping at least one of the plurality of images of the physical environment based on the warp definition. In various implementations, the control parameters include virtual content. Thus, in various implementations, processing the plurality of images of the physical environment includes combining at least one of the plurality of images of the physical environment with the virtual content. In various implementations, the control parameters include an alpha mask. Thus, in various implementations, processing the plurality of images of the physical environment includes combining at least one of the plurality of images of the physical environment with another image (e.g., of virtual content) according to the alpha mask. In various implementations, the control parameters include a hole-filling color. Thus, in various implementations, processing the plurality of images of the physical environment includes filling holes in at least one of the plurality of images of the physical environment with the hole-filling color.

The method 300 continues, in block 350, with the device displaying, on the display at the first frame rate, the plurality of processed images of the physical environment. In various implementations, a respective start time of displaying each of the plurality of processed images of the physical environment is a fixed time after a respective start time of capturing a corresponding one of the plurality of images of the physical environment. In particular, the fixed time is a fixed frame period (the inverse of the first frame rate).

In contrast, in various implementations, a respective start time of transmitting at least some of the subset of the plurality of images of the physical environment is a variable time after the respective start time of capturing a corresponding one of the plurality of image of the physical environment. For example, the image may be transmitted after a variable capture time period (due to a variable exposure time period). As another example, the image may be transmitted after a variable processing time period to perform one or more image processing functions on a raw image. Similarly, a respective start time of receiving control parameters based on at least some of the subset of the plurality of images of the physical environment is a variable time after a respective start time of capturing each of the plurality of images of the physical environment. Thus, whereas capturing (in block 310) and displaying (in block 350) are synchronized ensuring that each captured image is processed and displayed after a fixed time frame period, the transmitting (in block 320) and receiving (in block 330) are performed asynchronously.

FIG. 4 is a flowchart representation of a method of performing chromatic aberration correction in accordance with some implementations. In various implementations, the method 400 is performed by a device including an image sensor, a display, one or more processors, and non-transitory memory (e.g., the electronic device 120 of FIG. 1). In some implementations, the method 400 is performed by processing logic, including hardware, firmware, software, or a combination thereof. In some implementations, the method 400 is performed by a processor executing instructions (e.g., code) stored in a non-transitory computer-readable medium (e.g., a memory).

The method 400 begins, in block 410, with the device capturing, with the image sensor, an image of a physical environment. For example, in FIG. 2, the image of the physical environment may correspond to an output image of the image sensor 201 or the first optional image processing module 220A.

The method 400 continues, in block 420, with the device warping the image of the physical environment to correct for distortion by a lens of the image sensor and/or a lens of the display to obtain a corrected image. For example, in FIG. 2, the corrected image may correspond to an output image of the first warping module 221A or the second optional image processing module 220B.

In various implementations, warping the image of the physical environment is based on distortion of the image of the physical environment by a lens of the image sensor. In various implementations, warping the image of the physical environment is based on distortion of the display image by a lens of the display. To that end, in various implementations, warping the image of the physical environment is based on a position of a pupil of an eye of a user with respect to the lens of the display.

In various implementations, distortion by the lens of the image sensor and/or the lens of the display is color-dependent. Accordingly, in various implementations, warping the image of the physical environment is based on a color. For example, in various implementations, the image of the physical environment is based on a color of a color channel, e.g., to minimize the distortion on that color channel.

In various implementations, warping the first color channel is performed as part of a transform to perform point-of-view correction to at least partially correct for a difference in perspective between the image sensor and the display. In various implementations, warping the first color channel is performed as part of a transform to perform foveation of the image of the physical environment.

The method 400 continues, in block 430, with the device blending the corrected image with virtual content to obtain a blended image including a first color channel and a second color channel. In various implementations, warping the image of the physical environment (in block 420) is based on a color of the first color channel. In various implementations, warping the image of the physical environment (in block 420) reduces distortion of the first color channel more than distortion of the second color channel. In various implementations, blending the corrected image of the physical environment with the virtual content includes performing color space conversion upon the corrected image such that the converted image is in the same image format as the virtual content.

In various implementations, blending the corrected image of the physical environment with the virtual content includes, for a particular pixel of the image at a pixel location, generating a weighted average of the pixel value of a corresponding pixel at the pixel location of the partially corrected image of the physical environment and a pixel value of a corresponding pixel at the pixel location of the virtual content, wherein the weighting is defined by an alpha value of a corresponding pixel at the pixel location of an alpha mask.

Thus, in various implementations, the first color channel is a weighted average (based on a first alpha mask) of a first color channel of the corrected image and a corresponding first color channel of the virtual content and the second color channel is a weighted average (based on a second alpha mask, which may be the same as or different than the first alpha mask) of a second color channel of the corrected image and a corresponding second color channel of the virtual content.

The method 400 continues, in block 440, with the device warping the second color channel to correct for chromatic aberration to obtain a display image including the first color channel and a warped second color channel. For example, in FIG. 2, the display image may correspond to an output image of the CAC module 225 or the sixth optional image processing module 220F.

Thus, in various implementations, all color channels are warped (in block 420) before blending (in block 430) and a second color channel is further warped (in block 440) after blending (in block 430), whereas the first color channel is not further warped (in block 440) after blending (in block 430). Thus, in various implementations, warping the second color channel excludes warping the first color channel.

In various implementations, the blended image further includes a third color channel. In various implementations, the third color channel is warped (in block 440) after blending (in block 430). Thus, in various implementations, warping the second color channel includes warping the third color channel. In various implementations, the third color channel is not warped (in block 440) after blending (in block 430). Thus, in various implementations, warping the second color channel excludes warping the third color channel.

For example, in various implementations, the blended image includes a red channel, a blue channel, and a green channel and warping the second color channel includes warping the red channel and the blue channel without warping the green channel. As another example, in various implementations, the blended image includes a luma channel, a first chroma channel, and a second chroma channel and warping the second color channel includes warping the first chroma channel without warping the luma channel or the second chroma channel.

The method 400 continues, in block 450, with the device displaying, on the display, the display image.

FIG. 5 is a flowchart representation of a method of blending an image with hole-filling virtual content in accordance with some implementations. In various implementations, the method 500 is performed by a device including an image sensor, a display, one or more processors, and non-transitory memory (e.g., the electronic device 120 of FIG. 1). In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device capturing, with the image sensor, an image of a physical environment. For example, in FIG. 2, the image of the physical environment may correspond to an output image of the image sensor 201 or the first optional image processing module 220A.

The method 500 continues, in block 520, with the device warping the image of the physical environment to generate a warped image. For example, in FIG. 2, the warped image may correspond to an output image of the first warping module 221A or the second optional image processing module 220B. In various implementations, the warped image includes a hole. In various implementations, the warped image includes multiple holes.

In various implementations, warping the image of the physical environment includes performing a forward mapping in which, for each pixel of the image of the physical environment at a pixel location in an input space, a destination pixel location is determined in an output space of the warped image. However, in some circumstances, not every destination pixel location is populated, resulting in one or more holes. In various implementations, warping the image of the physical environment includes performing a backwards mapping in which, for each pixel of the warped image at a pixel location in the output space, a source pixel location is determined in the input space. However, in some circumstances, a source pixel location cannot be identified or the source pixel location does not have a pixel value (e.g., the source pixel location is outside of the image of the physical environment), resulting in one or more holes.

In various implementations, warping the image of the physical environment includes identifying pixels of the hole. For example, in various implementations, warping the image of the physical environment includes determining a pixel value for each pixel of the warped image, wherein pixel values of the hole are a hole value, which may be 0, NaN, or any other value identifying the pixel as a pixel of the hole.

The method 500 continues, in block 530, with the device obtaining a hole-filling color. In various implementations, the hole-filling color is represented by a color triplet (e.g., a RGB value or a YCbCr value). In various implementations, the hole-filling color is a default hole-filling color, which may be, for example, white, black, or gray. In various implementations, the hole-filling color is an average of at least a portion of the image of the physical environment. For example, in various implementations, the hole-filling color is an average of the entire image of the physical environment. As another example, in various implementations, the hole-filling color is an average of a region surrounding a gaze location of a user. In various implementations, the hole-filling color is user-defined or application-defined.

The method 500 continues, in block 540, with the device blending the warped image with virtual content to generate a blended image, wherein blending the warped image includes filling the hole by setting pixel values of pixels of the hole to the hole-filling color. In various implementations, the virtual content includes hole-filling virtual content having the hole-filling color and a size and shape of the hole. For example, in FIG. 2, the blended image may correspond to an output image of the blending module 223, the fifth optional image processing module 220E, the CAC module 225, or the sixth optional image processing module 220F.

The method 500 continues, in block 550, with the device displaying, on the display, the blended image.

FIG. 6 is a flowchart representation of a method of pipelined blending an image with virtual content in accordance with some implementations. In various implementations, the method 600 is performed by a device including an image sensor, a display, one or more processors, and non-transitory memory (e.g., the electronic device 120 of FIG. 1). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device capturing, with the image sensor, a first portion of an image of a physical environment. For example, in FIG. 3A, the first portion of the image of the physical environment may correspond to the first line of the first image captured between $t_0$ and $t_0+T_{x1}+T_r$.

The method 600 continues, in block 620, with the device warping the first portion of the image of the physical environment to generate a warped first portion. For example, in FIG. 3A, the warped first portion may correspond to the first line of the first warped image warped between $t_{w1}$ and $t_{w1}+T_w$.

In various implementations, warping the first portion includes warping the first portion to correct for a difference in perspective between the image sensor and the display. In various implementations, warping the first portion includes warping the first portion to correct for distortion by a lens of the image sensor and/or a lens of the display. In various implementations, warping the first portion includes warping the first portion to correct for optical crosstalk. In various implementations, warping the first portion includes warping the first portion to perform foveation.

In various implementations, warping the first portion includes warping the first portion of virtual content. In various implementations, warping the first portion includes warping a first portion of an alpha mask.

The method 600 continues, in block 630, with the device blending the warped first portion with a first portion of virtual content to generate a blended first portion. For example, in FIG. 3A, the blended first portion may correspond to the first line of the first blended image blended between $t_{b1}$ and $t_{b1}+T_b$. In various implementations, blending the first portion is based on the warped first portion of the alpha mask.

The method 600 continues, in block 640, with the device displaying, on the display, the blended first portion. For example, in FIG. 3A, the blended first portion may correspond to the first line of the first blended image displayed between $t_1$ and $t_2$.

The method 600 continues, in block 650, with the device capturing, with the image sensor, a second portion of the image of a physical environment. For example, in FIG. 3A, the second portion of the image of the physical environment may correspond to the last line of the first image captured between $T_{C1}-T_{x1}-T_r$ and $T_{c1}$.

The method 600 continues, in block 660, with the device warping the second portion of the image of the physical environment to generate a warped second portion. For example, in FIG. 3A, the warped second portion may correspond to the last line of the first warped image warped between $t_{w2}-T_w$ and $t_{w2}$.

The method 600 continues, in block 670, with the device blending the warped second portion with a second portion of virtual content to generate a blended second portion. For example, in FIG. 3A, the blended second portion may correspond to the last line of the first blended image blended between $t_{b2}-T_b$ and $t_{b2}$.

The method 600 continues, in block 680, with the device displaying, on the display, the blended second portion, wherein displaying the blended first portion (in block 640) is initiated before blending the warped second portion (in block 670) is completed. For example, in FIG. 3A, the blended second portion may correspond to the last line of the first blended image displayed between $t_1+T_d-T_e-T_p$ and $t_1+T_d$.

In various implementations, blending the warped first portion (in block 630) is initiated before warping the second portion of the image of the physical environment (in block 660) is completed. In various implementations, warping the first portion of the image of the physical environment (in block 620) is initiated before capturing the second portion of the image of the physical environment (in block 650) is completed. In various implementations, blending may be performed rapidly enough that displaying of the blended first portion (in block 640) is initiated before warping the second portion of the image of the physical environment (in block 660) is completed.

In various implementations, the time between beginning to capture the first portion of the image of the physical environment and finishing blending of the second warped portion is greater than a frame period, e.g., an amount of time between the start of capture time periods. Similarly, in various implementations, the time between beginning to capture the first portion of the image of the physical environment and beginning to display the second blended portion is greater than a frame period, e.g., an amount of time between the start of capture time periods.

In various implementations, the warped first portion includes one or more holes. In various implementations, the method 600 further includes obtaining a hole-filling color. In various implementations, blending the warped first portion with the first portion of the virtual content includes filling at least one of the one or more holes by setting pixel values of pixels of the at least one of the one or more holes to the hole-filling color.

Figure 7:
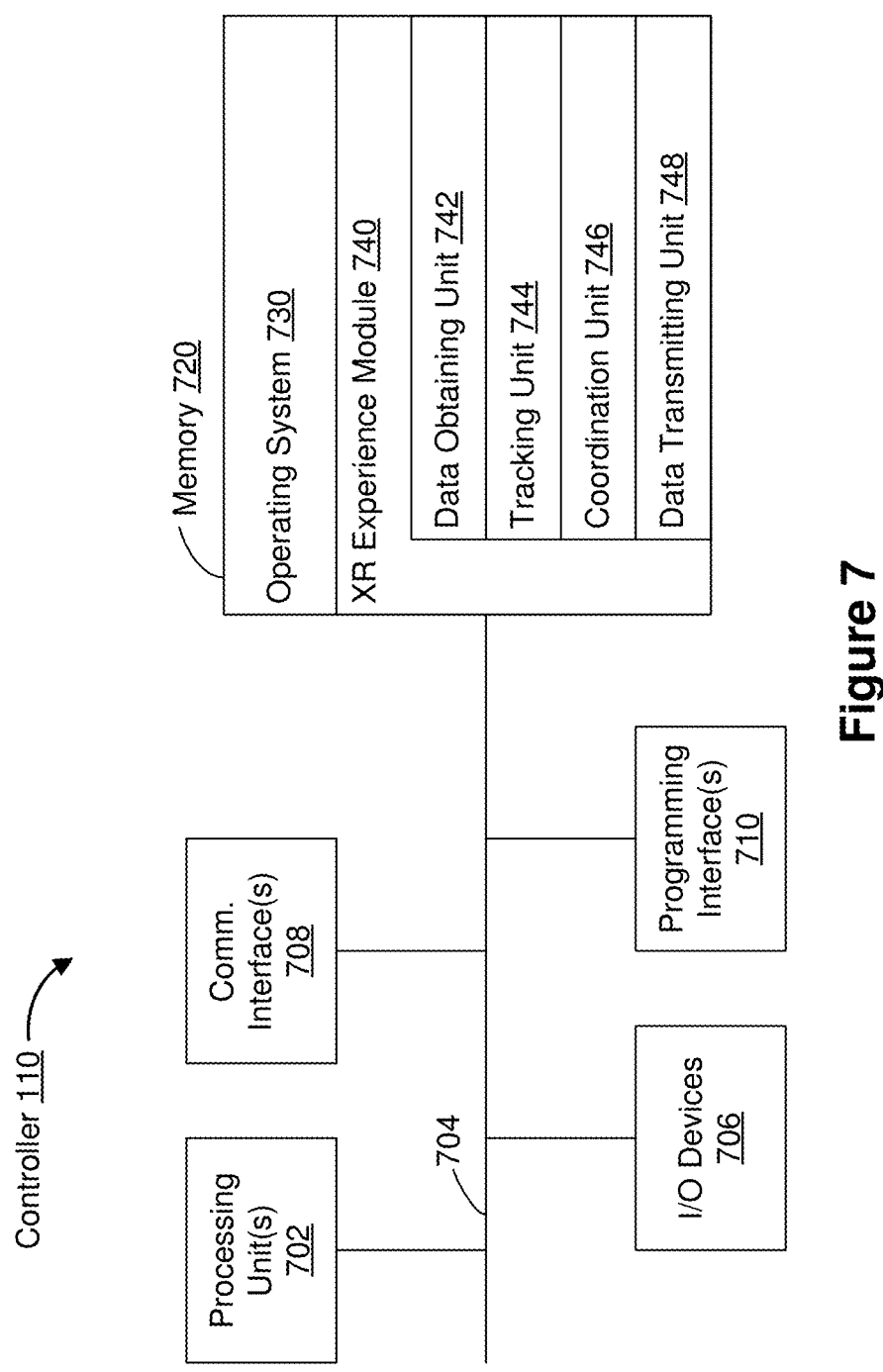
FIG. 7 is a block diagram of an example controller in accordance with some implementations.

FIG. 7 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 702 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 706, one or more communication interfaces 708 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 710, a memory 720, and one or more communication buses 704 for interconnecting these and various other components.

In some implementations, the one or more communication buses 704 include circuitry that interconnects and controls communications between system components. In some implementations, the one or more I/O devices 706 include at least one of a keyboard, a mouse, a touchpad, a joystick, one or more microphones, one or more speakers, one or more image sensors, one or more displays, and/or the like.

The memory 720 includes high-speed random-access memory, such as dynamic random-access memory (DRAM), static random-access memory (SRAM), double-data-rate random-access memory (DDR RAM), or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730 and an XR experience module 740.

The operating system 730 includes procedures for handling various basic system services and for performing hardware dependent tasks. In some implementations, the XR experience module 740 is configured to manage and coordinate one or more XR experiences for one or more users (e.g., a single XR experience for one or more users, or multiple XR experiences for respective groups of one or more users). To that end, in various implementations, the XR experience module 740 includes a data obtaining unit 742, a tracking unit 744, a coordination unit 746, and a data transmitting unit 748.

In some implementations, the data obtaining unit 742 is configured to obtain data (e.g., presentation data, interaction data, sensor data, location data, etc.) from at least the electronic device 120 of FIG. 1. To that end, in various implementations, the data obtaining unit 742 includes instructions and/or logic therefor, and heuristics and metadata therefor.

In some implementations, the tracking unit 744 is configured to map the physical environment 105 and to track the position/location of at least the electronic device 120 with respect to the physical environment 105 of FIG. 1. To that end, in various implementations, the tracking unit 744 includes instructions and/or logic therefor, and heuristics and metadata therefor.

In some implementations, the coordination unit 746 is configured to manage and coordinate the XR experience presented to the user by the electronic device 120. To that end, in various implementations, the coordination unit 746 includes instructions and/or logic therefor, and heuristics and metadata therefor.

In some implementations, the data transmitting unit 748 is configured to transmit data (e.g., presentation data, location data, etc.) to at least the electronic device 120. To that end, in various implementations, the data transmitting unit 748 includes instructions and/or logic therefor, and heuristics and metadata therefor.

Although the data obtaining unit 742, the tracking unit 744, the coordination unit 746, and the data transmitting unit 748 are shown as residing on a single device (e.g., the controller 110), it should be understood that in other implementations, any combination of the data obtaining unit 742, the tracking unit 744, the coordination unit 746, and the data transmitting unit 748 may be located in separate computing devices.

Moreover, FIG. 7 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 8:
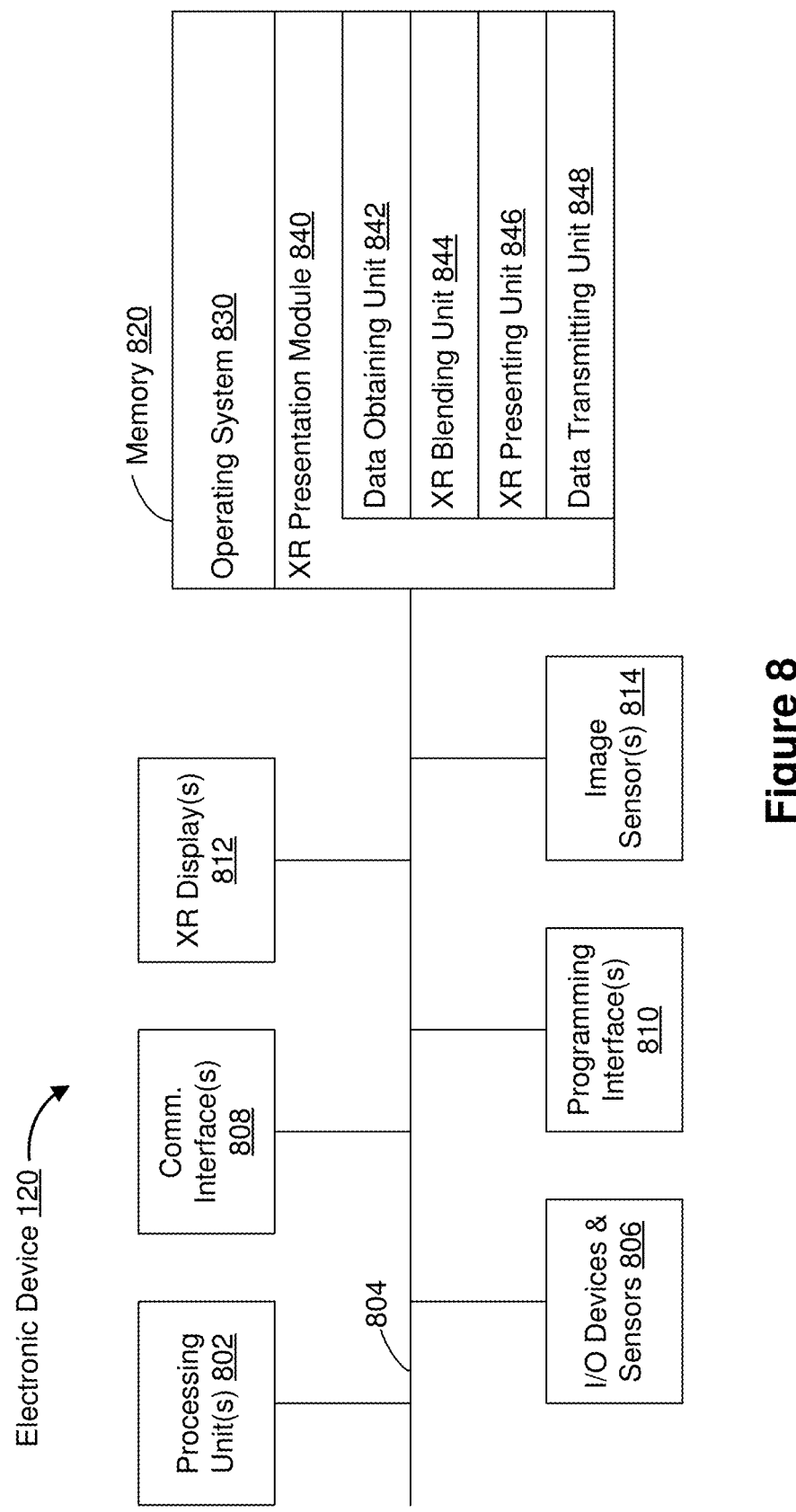
FIG. 8 is a block diagram of an example electronic device in accordance with some implementations.

FIG. 8 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 810, one or more XR displays 812, one or more optional interior- and/or exterior-facing image sensors 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 812 are configured to provide the XR experience to the user. In some implementations, the one or more XR displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 812 correspond to diffractive, reflective, polarized, holographic, etc. waveguide displays. For example, the electronic device 120 includes a single XR display. In another example, the electronic device includes an XR display for each eye of the user. In some implementations, the one or more XR displays 812 are capable of presenting MR and VR content.

In some implementations, the one or more image sensors 814 are configured to obtain image data that corresponds to at least a portion of the face of the user that includes the eyes of the user (any may be referred to as an eye-tracking camera). In some implementations, the one or more image sensors 814 are configured to be forward-facing so as to obtain image data that corresponds to the physical environment as would be viewed by the user if the electronic device 120 was not present (and may be referred to as a scene camera). The one or more optional image sensors 814 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium. In some implementations, the memory 820 or the non-transitory computer readable storage medium of the memory 820 stores the following programs, modules and data structures, or a subset thereof including an optional operating system 830 and an XR presentation module 840.

The operating system 830 includes procedures for handling various basic system services and for performing hardware dependent tasks. In some implementations, the XR presentation module 840 is configured to present XR content to the user via the one or more XR displays 812. To that end, in various implementations, the XR presentation module

840 includes a data obtaining unit 842, a XR blending unit 844, an XR presenting unit 846, and a data transmitting unit 848.

In some implementations, the data obtaining unit 842 is configured to obtain data (e.g., presentation data, interaction data, sensor data, location data, etc.) from at least the controller 110 of FIG. 1. To that end, in various implementations, the data obtaining unit 842 includes instructions and/or logic therefor, and heuristics and metadata therefor.

In some implementations, the XR blending unit 844 is configured to blend a passthrough image with virtual content to generate an XR image. To that end, in various implementations, the XR blending unit 844 includes instructions and/or logic therefor, and heuristics and metadata therefor.

In some implementations, the XR presenting unit 846 is configured to display the XR image via the one or more XR displays 812. To that end, in various implementations, the XR presenting unit 846 includes instructions and/or logic therefor, and heuristics and metadata therefor.

In some implementations, the data transmitting unit 848 is configured to transmit data (e.g., presentation data, location data, etc.) to at least the controller 110. In some implementations, the data transmitting unit 848 is configured to transmit authentication credentials to the electronic device. To that end, in various implementations, the data transmitting unit 848 includes instructions and/or logic therefor, and heuristics and metadata therefor.

Although the data obtaining unit 842, the XR blending unit 844, the XR presenting unit 846, and the data transmitting unit 848 are shown as residing on a single device (e.g., the electronic device 120), it should be understood that in other implementations, any combination of the data obtaining unit 842, the XR blending unit 844, the XR presenting unit 846, and the data transmitting unit 848 may be located in separate computing devices.

Moreover, FIG. 8 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including an image sensor, a display, one or more processors, and non-transitory memory:
capturing, with the image sensor, a first portion of a first image of a physical environment;
warping the first portion of the first image of the physical environment to generate a warped first portion;
blending the warped first portion with a first portion of virtual content to generate a blended first portion;
displaying, on the display, the blended first portion;
capturing, with the image sensor, a second portion of the first image of the physical environment;
warping the second portion of the first image of the physical environment to generate a warped second portion;
blending the warped second portion with a second portion of the virtual content to generate a blended second portion;
displaying, on the display, the blended second portion; and
capturing, with the image sensor, a first portion of a second image of the physical environment,
wherein displaying the blended first portion and capturing the first portion of the second image of the physical environment are initiated before blending the warped second portion is completed.

2. The method of claim 1, wherein blending the warped first portion is initiated before warping the second portion of the first image of the physical environment is completed.

3. The method of claim 1, wherein warping the first portion of the first image of the physical environment is initiated before capturing the second portion of the first image of the physical environment is completed.

4. The method of claim 1, wherein displaying the blended first portion is initiated before warping the second portion of the first image of the physical environment is completed.

5. The method of claim 1, wherein a time between beginning to capture the first portion of the first image of the physical environment and finishing blending of the second warped portion is greater than a frame period.

6. The method of claim 5, wherein the frame period is an amount of time between beginning to capture the first portion of the first image and beginning to capture the first portion of the second image.

7. The method of claim 1, wherein a time between beginning to capture the first portion of the first image of the physical environment and beginning to display the second blended portion is greater than a frame period.

8. The method of claim 7, wherein the frame period is an amount of time between beginning to capture the first portion of the first image and beginning to capture the first portion of the second image.

9. The method of claim 1,
wherein warping the first portion of the first image of the physical environment includes warping the first portion of the first image of the physical environment to correct for distortion by a lens of the image sensor and/or a lens of the display,
wherein the blended first portion includes a first color channel and a second color channel,
further comprising warping the second color channel to correct for chromatic aberration such that the blended first portion includes the first color channel and a warped second color channel.

10. The method of claim 1,
wherein the warped first portion includes a hole,
further comprising obtaining a hole-filling color,
wherein blending the warped first portion with the first portion of the virtual content includes filling the hole by setting pixel values of pixels of the hole to the hole-filling color.

11. The method of claim 1, wherein warping the first portion of the first image of the physical environment includes warping the first portion of the first image of the physical environment to correct for a difference in perspective between the image sensor and the display.

12. The method of claim 1, wherein warping the first portion of the first image of the physical environment includes warping the first portion of the first image of the physical environment to correct for distortion by a lens of the image sensor and/or a lens of the display.

13. The method of claim 1, wherein warping the first portion of the first image of the physical environment includes warping the first portion of the first image of the physical environment to correct for optical crosstalk.

14. The method of claim 1, wherein warping the first portion of the first image of the physical environment includes warping the first portion of the first image of the physical environment to perform foveation.

15. The method of claim 1, wherein warping the first portion of the first image of the physical environment includes warping the first portion of virtual content.

16. The method of claim 1, wherein warping the first portion of the first image of the physical environment includes warping a first portion of an alpha mask.

17. The method of claim 16, wherein blending the warped first portion is based on the warped first portion of the alpha mask.

18. A device comprising:

an image sensor;

a display;

a non-transitory memory; and one or more processors to:

capture, with the image sensor, a first portion of a first image of a physical environment;

warp the first portion of the first image of the physical environment to generate a warped first portion;

blend the warped first portion with a first portion of virtual content to generate a blended first portion;

display, on the display, the blended first portion;

capture, with the image sensor, a second portion of the first image of the physical environment;

warp the second portion of the first image of the physical environment to generate a warped second portion;

blend the warped second portion with a second portion of the virtual content to generate a blended second portion;

display, on the display, the blended second portion; and capture, with the image sensor, a first portion of a second image of the physical environment, wherein displaying the blended first portion and capturing the first portion of the second image of the physical environment are initiated before blending the warped second portion is completed.

19. The device of claim 18, wherein the one or more processors are to warp the first portion of the first image of the physical environment to correct for a difference in perspective between the image sensor and the display.

20. A non-transitory memory storing one or more programs, which, when executed by one or more processors of a device including an image sensor and a display, cause the device to:

capture, with the image sensor, a first portion of a first image of a physical environment;

warp the first portion of the first image of the physical environment to generate a warped first portion;

blend the warped first portion with a first portion of virtual content to generate a blended first portion;

display, on the display, the blended first portion;

capture, with the image sensor, a second portion of the first image of the physical environment;

warp the second portion of the first image of the physical environment to generate a warped second portion;

blend the warped second portion with a second portion of the virtual content to generate a blended second portion;

display, on the display, the blended second portion; and capture, with the image sensor, a first portion of a second image of the physical environment, wherein displaying the blended first portion and capturing the first portion of the second image of the physical environment are initiated before blending the warped second portion is completed.

\* \* \* \* \*